United States Patent
Kowalski (10) Patent No.: US 7,602,697 B2
(45) Date of Patent: Oct. 13, 2009

(54) SYSTEMS AND METHODS FOR REDUCING THE PEAK-TO-AVERAGE-POWER RATIO IN AN OFDM-BASED SYSTEM

(75) Inventor: John M. Kowalski, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 518 days.

(21) Appl. No.: 11/402,351

(22) Filed: Apr. 12, 2006

(65) Prior Publication Data

US 2007/0242598 A1    Oct. 18, 2007

(51) Int. Cl.
H04B 14/04    (2006.01)
(52) U.S. Cl. .................. 370/208; 375/260; 375/254
(58) Field of Classification Search ......... 370/200–253, 370/272–309, 431–546
See application file for complete search history.

(56) References Cited

U.S. PATENT DOCUMENTS

| | | | |
|---|---|---|---|
| 6,925,128 B2 | 8/2005 | Corral | |
| 2002/0181390 A1* | 12/2002 | Mody et al. | 370/208 |
| 2004/0146115 A1* | 7/2004 | Feng et al. | 375/260 |
| 2005/0089109 A1* | 4/2005 | Yun et al. | 375/260 |
| 2005/0195905 A1 | 9/2005 | Kowalski | |
| 2005/0238110 A1 | 10/2005 | Yun et al. | |
| 2005/0270968 A1 | 12/2005 | Feng et al. | |

FOREIGN PATENT DOCUMENTS

WO    2005/025102    3/2005

OTHER PUBLICATIONS

"Tone Reservation method for PAPR Reduction scheme," IEEE 802.16e-03/60, Nov. 2003. http://www.ieee802.org/16/tge/contrib/C80216e-03_60r1.pdf.
"An Active-Set Approach for OFDM PAR Reduction via Tone Reservation," IEEE Trans. Signal Processing.
B. Le Floch et al., "Coded Orthogonal Frequency Division Multiplex," pp. 982-996, Proceedings of the IEEE, vol. 83, No. 6, Jun. 1995.
"Physical Layer Aspects for Evolved UTRA (Release 7)," 3GPP TR 25.814 v1.01. Nov. 2005.
S. Han and J. Lee, "An Overview of Peak-to-Average Power Ratio Reduction Techniques for Multicarrier Transmission," pp. 56-65, IEEE Wireless Communications, Apr. 2005.
J. Tellado, "Peak to Average Power Reduction for Multicarrier Modulation," Ph.D. Thesis, Stanford University, Sep. 1999.

* cited by examiner

*Primary Examiner*—Ricky Ngo
*Assistant Examiner*—Iqbal Zaidi
(74) *Attorney, Agent, or Firm*—Austin Rapp & Hardman (57) ABSTRACT

In an exemplary embodiment, an orthogonal frequency division multiplexing (OFDM) system includes an OFDM transmitter and an OFDM receiver that is configured to receive OFDM signals from the OFDM transmitter over a communication channel. The OFDM signals comprise a plurality of tones including data bearing tones that carry data and reserved tones for generating peak-to-average-power (PAPR) reduction signals. The OFDM system also includes a channel estimation component that is configured to estimate communication channel information for the data bearing tones and also for the reserved tones. The OFDM system also includes a tone selection component that is configured to determine tone selection information based on the estimated communication channel information.

19 Claims, 8 Drawing Sheets

SYSTEMS AND METHODS FOR REDUCING THE PEAK-TO-AVERAGE-POWER RATIO IN AN OFDM-BASED SYSTEM

TECHNICAL FIELD

The present invention relates generally to wireless communication systems. More specifically, the present invention relates to systems and methods for reducing the peak-to-average-power ratio in an OFDM-based system.

BACKGROUND

A wireless communication system typically includes a base station in wireless communication with a plurality of user devices (which may also be referred to as mobile stations, subscriber units, access terminals, etc.). The base station transmits data to the user devices over a radio frequency (RF) communication channel. The term "downlink" refers to transmission from a base station to a user device, while the term "uplink" refers to transmission from a user device to a base station.

Orthogonal frequency division multiplexing (OFDM) is a modulation and multiple-access technique whereby the transmission band of a communication channel is divided into a number of equally spaced sub-bands. A sub-carrier carrying a portion of the user information is transmitted in each sub-band, and every sub-carrier is orthogonal with every other sub-carrier. Sub-carriers are sometimes referred to as "tones." OFDM enables the creation of a very flexible system architecture that can be used efficiently for a wide range of services, including voice and data. OFDM is sometimes referred to as discrete multitone transmission (DMT).

The 3rd Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union. The 3GPP Long Term Evolution ("LTE") Committee is considering OFDM as well as OFDM/OQAM (Orthogonal Frequency Division Multiplexing/Offset Quadrature Amplitude Modulation), as a method for downlink transmission, as well as OFDM transmission on the uplink.

The proposed OFDM-based modulation schemes, both on the uplink and the downlink, would require a relatively high peak to average power ratio (PAPR). This is because the amplitude of an OFDM signal is the summation of the amplitudes of the respective sub-carriers. As a result, the amplitude of an OFDM signal may change quite significantly. When a modulated signal with a high PAPR passes through an RF processing unit, the signal may be distorted due to the non-linearity of a regular RF amplifier.

A number of techniques have been proposed for reducing the PAPR of OFDM signals. One example of such a technique is tone reservation. With tone reservation, both the transmitting device and the receiving device agree on reserving a subset of tones (sub-carriers) for generating PAPR reduction signals. In other words, a tone reservation scheme holds a subset of tones "in reserve" to be solely used for PAPR reduction. The present disclosure relates to the issue of determining which tones are reserved for PAPR reduction and which tones are used for payload transmission.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Systems and methods for reducing the peak-to-average-power ratio (PAPR) in an OFDM-based system are disclosed herein. In an exemplary embodiment, an orthogonal frequency division multiplexing (OFDM) system that is configured to implement an optimized tone reservation scheme includes an OFDM transmitter and an OFDM receiver. The OFDM receiver is configured to receive OFDM signals from the OFDM transmitter over a communication channel. The OFDM signals comprise a plurality of tones including data bearing tones that carry data and reserved tones for generating PAPR reduction signals. The system also includes a channel estimation component that is configured to estimate communication channel information for the data bearing tones and also for the reserved tones. The estimated communication channel information may include estimated signal-to-noise ratio (SNR) measurements for each of the plurality of tones in the OFDM signals. The system also includes a tone selection component that is configured to determine tone selection information based on the estimated communication channel information. The system may also include a tone modification component that is configured to modify the selection of the reserved tones and the data bearing tones in the OFDM signals based on the tone selection information.

In some embodiments, the tone selection component is implemented in the OFDM receiver, and the tone selection component sends the tone selection information to the OFDM transmitter. Alternatively, the tone selection component may be implemented in the OFDM transmitter, and the channel selection component sends the estimated communication channel information to the OFDM transmitter.

In some embodiments, the tone selection information may identify an optimum set of reserved tones. For example, if the OFDM signals comprise a total of N tones including K reserved tones, determining the optimum set of reserved tones may involve identifying the K worst estimated signal-to-noise ratio (SNR) measurements. Alternatively, the tone selection information may identify an optimum set of data bearing tones. For example, if the OFDM signals comprise a total of N tones including N−K data bearing tones, determining the optimum set of data bearing tones may involve identifying the N−K best estimated SNR measurements.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Figure 1:
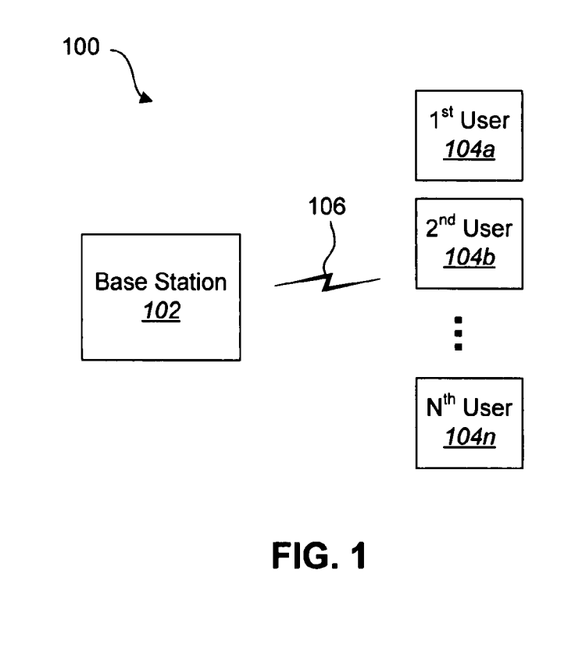
FIG. 1 illustrates an exemplary wireless communication system in which embodiments may be practiced.

FIG. 1 illustrates an exemplary wireless communication system 100 in which embodiments may be practiced. A base station 102 is in wireless communication with a plurality of user devices 104 (which, as indicated above, may also be referred to as mobile stations, subscriber units, access terminals, etc.). A first user device 104a, a second user device 104b, and an Nth user device 104n are shown in FIG. 1. The base station 102 transmits data to the user devices 104 over a radio frequency (RF) communication channel 106.

As used herein, the term "OFDM transmitter" refers to any component or device that transmits OFDM signals. An OFDM transmitter may be implemented in a base station 102 that transmits OFDM signals to one or more user devices 104. Alternatively, an OFDM transmitter may be implemented in a user device 104 that transmits OFDM signals to one or more base stations 102.

The term "OFDM receiver" refers to any component or device that receives OFDM signals. An OFDM receiver may be implemented in a user device 104 that receives OFDM signals from one or more base stations 102. Alternatively, an OFDM receiver may be implemented in a base station 102 that receives OFDM signals from one or more user devices 104.

Figure 2:
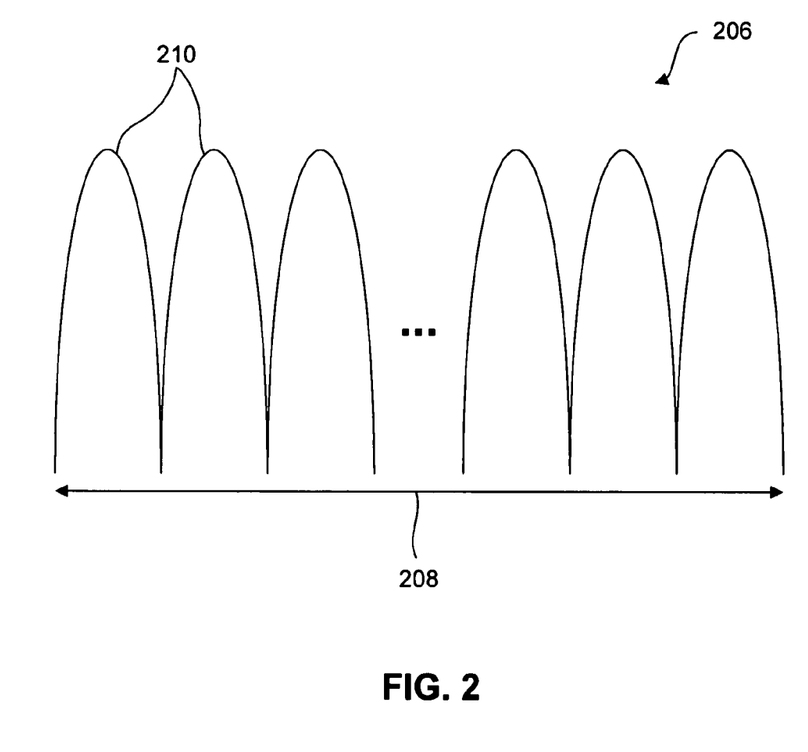
FIG. 2 illustrates some characteristics of a transmission band of an RF communication channel in accordance with an OFDM-based system.

FIG. 2 illustrates some characteristics of a transmission band 208 of an RF communication channel 206 in accordance with an OFDM-based system. As shown, the transmission band 208 may be divided into a number of equally spaced sub-bands 210. As mentioned above, a sub-carrier carrying a portion of the user information is transmitted in each sub-band 210, and every sub-carrier is orthogonal with every other sub-carrier.

Figure 3:
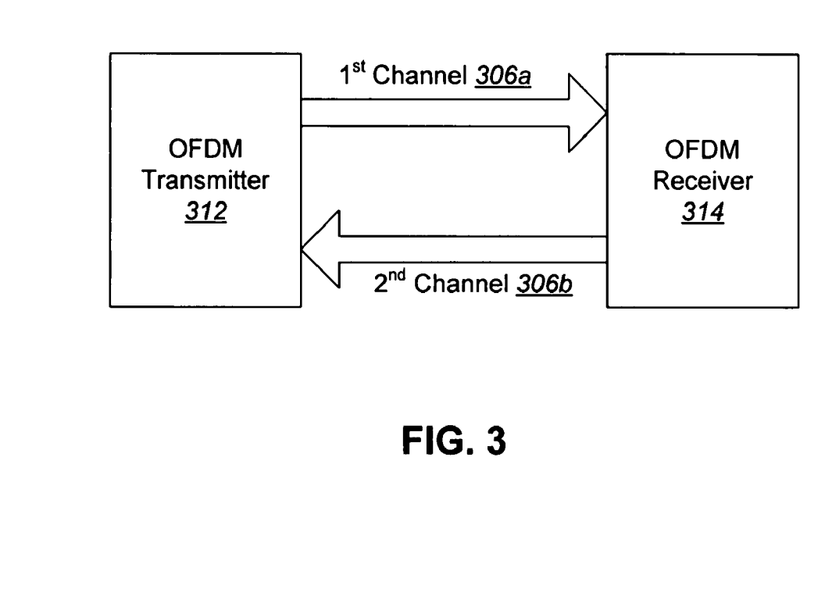
FIG. 3 illustrates communication channels that may exist between an OFDM transmitter and an OFDM receiver according to an embodiment.

FIG. 3 illustrates communication channels 306 that may exist between an OFDM transmitter 312 and an OFDM receiver 314 according to an embodiment. As shown, communication from the OFDM transmitter 312 to the OFDM receiver 314 may occur over a first communication channel 306a. Communication from the OFDM receiver 314 to the OFDM transmitter 312 may occur over a second communication channel 306b.

The first communication channel 306a and the second communication channel 306b may be separate communication channels 306. For example, there may be no overlap between the transmission band of the first communication channel 306a and the transmission band of the second communication channel 306b.

As indicated above, "tone reservation" is an example of a technique that has been proposed for reducing the PAPR of OFDM signals. A mathematical explanation of the tone reservation technique will now be provided.

With tone reservation, both the OFDM transmitter 312 and the OFDM receiver 314 agree on reserving a subset of tones (sub-carriers) for generating peak-to-average-power (PAPR) reduction signals. It will be assumed that there are a total of N available tones, and K tones are reserved. Let X be an OFDM-based frequency-domain data signal and $C = [C_0, C_1, \ldots, C_{K-1}]$ be a vector on subset $\mathcal{R}$, which is where $X \cap C$ is null. That is, X and C represent non-overlapping sets of modulated OFDM signals. The goal of the tone reservation method is to find the optimum code value C so that:

$$\min_c \|x + c\|_\infty = \min_C \|x + \hat{Q}c\|_\infty < \|x\|_\infty \qquad (1)$$

In equation (1), the term x is the time domain signal of X. The term c is the time domain signal of C. The term $\hat{Q}$ is an N×K sub-matrix of Q, which is an N×N inverse discrete fourier transform (DFT) matrix. The term $\|v\|_\infty$, is the ∞ norm of v (that is, the maximum absolute value).

Figure 4:
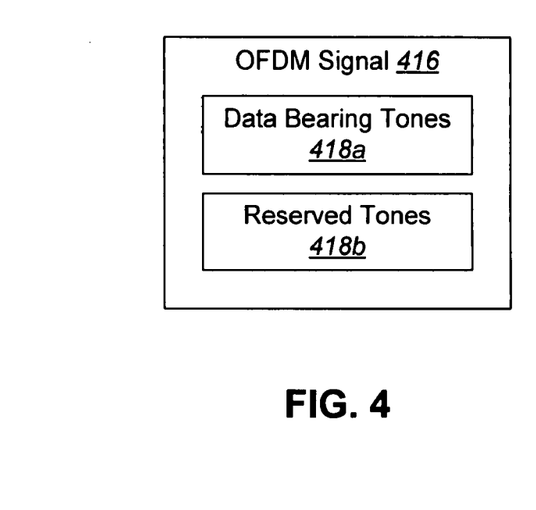
FIG. 4 illustrates an exemplary OFDM signal that may be sent from an OFDM transmitter to an OFDM receiver in accordance with the tone reservation technique.

FIG. 4 illustrates an exemplary OFDM signal 416 that may be sent from an OFDM transmitter 312 to an OFDM receiver 314 in accordance with the tone reservation technique. The OFDM signal 416 includes a plurality of tones 418. As shown, some tones 418a in the OFDM signal 416 may be used to carry data. These tones 418a will be referred to herein as data bearing tones 418a. Other tones 418b in the OFDM signal 416 may be reserved for generating PAPR reduction signals. These tones 418b will be referred to herein as reserved tones 418b.

Figure 5:
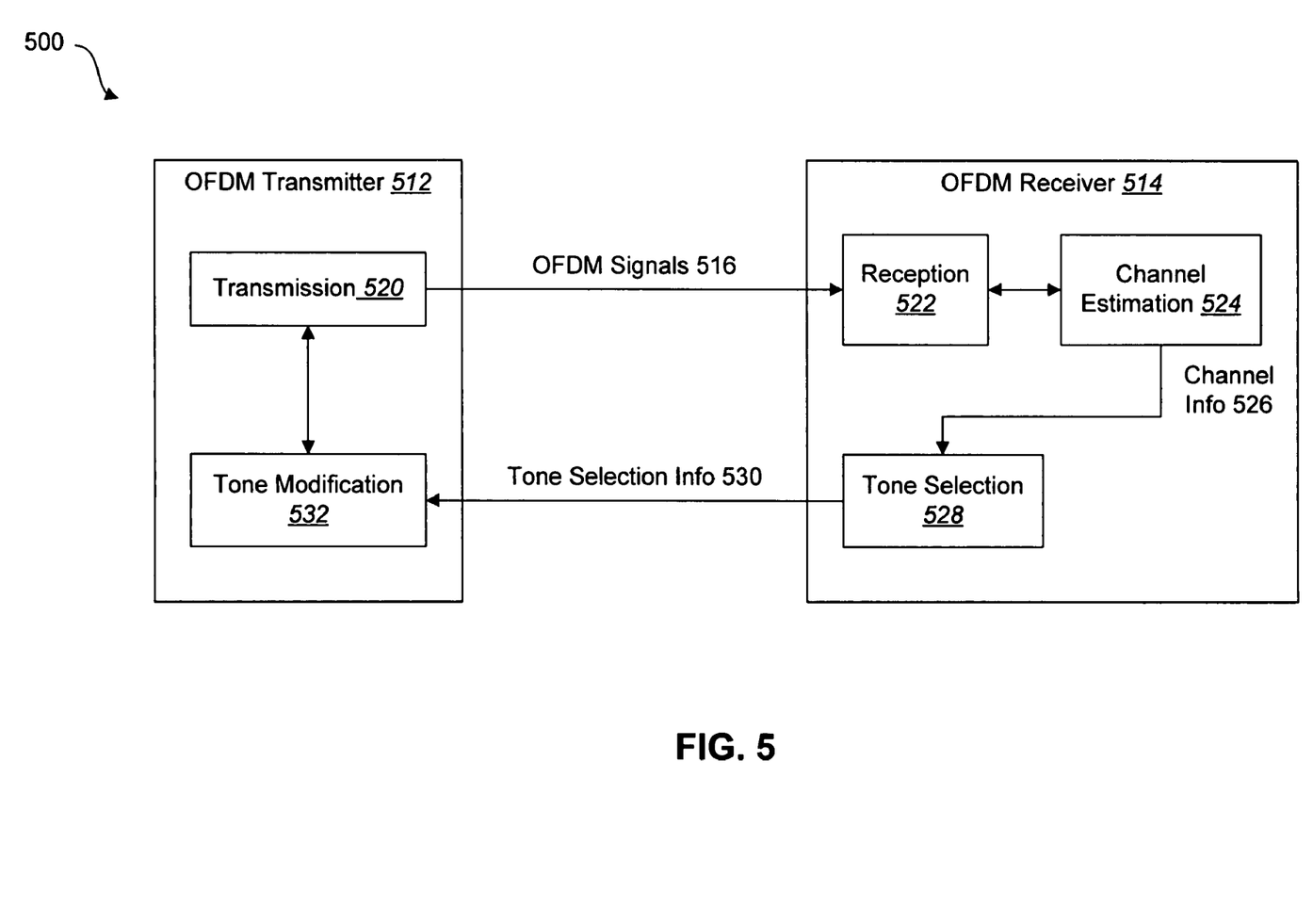
FIG. 5 illustrates an embodiment of a system for implementing an optimized tone reservation scheme.

FIG. 5 illustrates an embodiment of a system 500 for implementing an optimized tone reservation scheme. The system 500 includes an OFDM transmitter 512 and an OFDM receiver 514. The OFDM transmitter 512 includes a signal transmission component 520 that is configured to send OFDM signals 516 to the OFDM receiver 514 over a communication channel 106. The OFDM receiver 514 includes a signal reception component 522 that is configured to receive the OFDM signals 516. As described above, the OFDM signals 516 may include a plurality of tones 418, including both data bearing tones 418a and reserved tones 418b.

The OFDM receiver 514 also includes a channel estimation component 524. The channel estimation component 524 is configured to estimate communication channel information 526 for the data bearing tones 418a and also for the reserved tones 418b in the OFDM signals 516. As will be discussed below, the channel information 526 may be estimates of signal-to-noise ratio (SNR) measurements for each of the tones 418 in the OFDM signals 516.

The OFDM receiver 514 also includes a tone selection component 528. The tone selection component 528 is configured to determine tone selection information 530 based on the estimated channel information 526. The tone selection component 528 is also configured to transmit the tone selection information 530 to the OFDM transmitter 512, and more specifically, to a tone modification component 532.

The tone selection information 530 is information that is related to the selection of reserved tones 418b and/or data bearing tones 418a in the OFDM signals 516. For example, the tone selection information 530 may identify an optimum set of reserved tones 418b to be used by the OFDM transmitter 512. As another example, the tone selection information 530 may identify an optimum set of data bearing tones 418a to be used by the OFDM transmitter 512.

Some examples that illustrate the operation of the tone selection component 528 will now be discussed. Suppose that the OFDM signals 516 include a total of N tones 418 including K reserved tones 418b and N−K data bearing tones 418a. Where the channel information 526 comprises estimated SNR measurements for all of the tones 418 in the OFDM signals 516, the tone selection component 528 may be configured to identify the K worst estimated SNR measurements. The corresponding tones 418 would then constitute an optimum set of reserved tones 418b. Alternatively, the tone selection component 528 may be configured to identify the N−K best estimated SNR measurements. The corresponding tones 418 would then constitute an optimum set of data bearing tones 418a.

In some embodiments, the channel estimation component 524 may periodically estimate the communication channel information 526, and the tone selection component 528 may periodically determine the tone selection information 530. In this context, the term "periodically" means occurring from time to time, although not necessarily at regular intervals. Thus, in such embodiments it is not necessary that the channel estimation component 524 estimates the channel information 526 at regular intervals or that the tone selection component 528 determines the tone selection information 530 at regular intervals.

In some embodiments, estimation may be done as a result of signaling initiated by the OFDM transmitter 512. For example, the OFDM transmitter 512 may send a command to the OFDM receiver 514 instructing it to perform tone estimation, and the channel estimation component 524 may estimate communication channel information 526 in response to the command.

The tone modification component 532 is configured to modify the selection of the reserved tones 418b and the data bearing tones 418a in the OFDM signals 516 based on the tone selection information 530 that is received from the tone selection component 528. For example, suppose that the tone selection information 530 identifies an optimum set of reserved tones 418b. If this occurs, the tone modification component 532 may signal the signal transmission component 520 to begin using the tones 418 specified in the tone selection information 530 as the reserved tones 418b in the OFDM signals 516. The remaining tones 418 may then be used as the data bearing tones 418a.

As another example, suppose that the tone selection information 530 identifies an optimum set of data bearing tones 418a. If this occurs, the tone modification component 532 may signal the signal transmission component 520 to begin using the tones 418 specified in the tone selection information 530 as the data bearing tones 418a in the OFDM signals 516. The remaining tones 418 may then be used as the reserved tones 418b.

The techniques disclosed herein may be utilized to verify physical layer protocol conformance. For example, transmission of the estimated communication channel information 526 from the OFDM receiver 514 to the OFDM transmitter 512 may be observed to verify physical layer protocol conformance. As another example, transmission of the reserved tones 418b from the OFDM transmitter 512 to the OFDM receiver 514 may be observed to verify physical layer protocol conformance.

Figure 6:
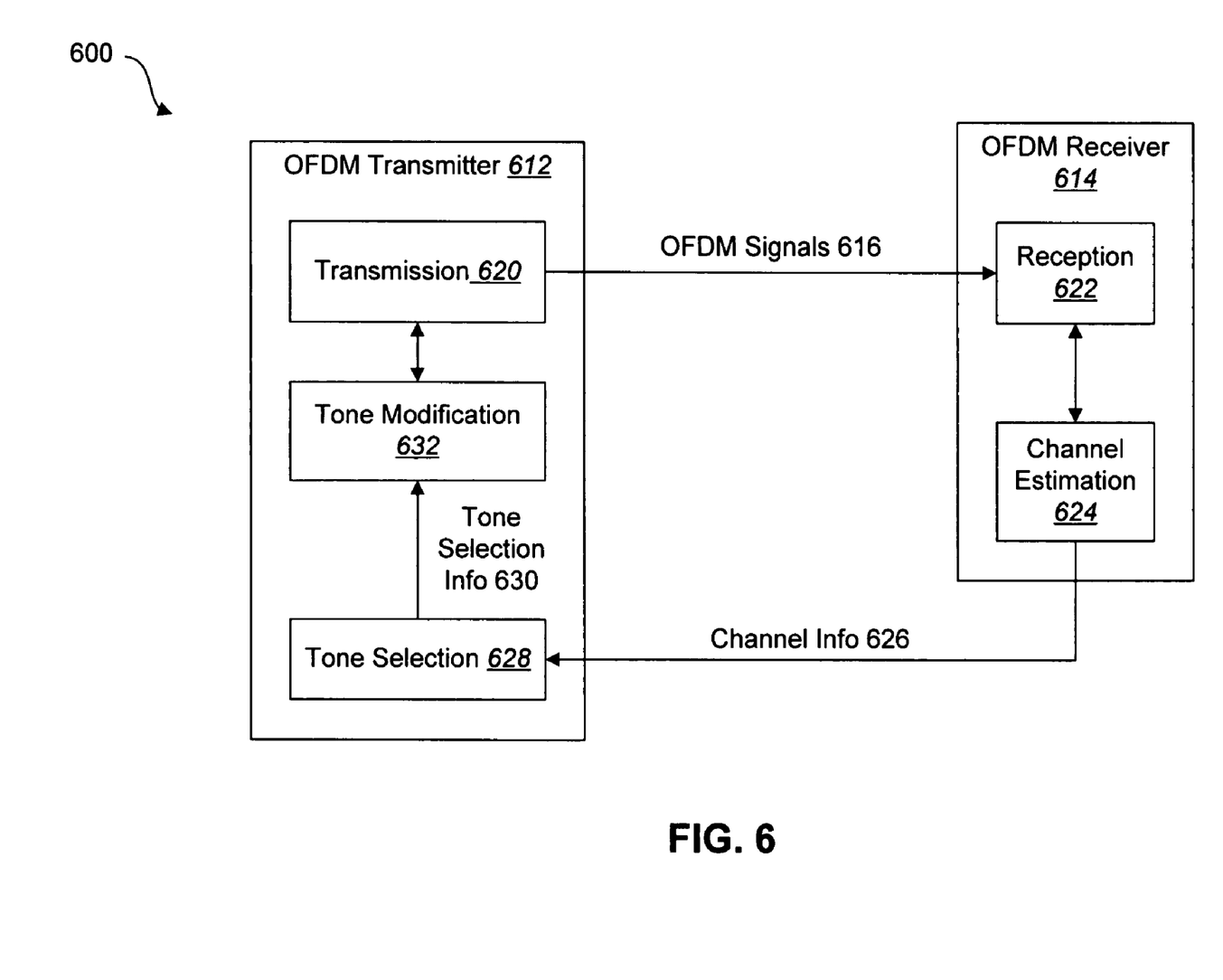
FIG. 6 illustrates another embodiment of a system for implementing an optimized tone reservation scheme.

FIG. 6 illustrates another embodiment of a system 600 for implementing an optimized tone reservation scheme. As before, the system 600 includes an OFDM transmitter 612 and an OFDM receiver 614. The OFDM transmitter 612 includes a signal transmission component 620 that is configured to send OFDM signals 616 to the OFDM receiver 614 over a communication channel 106. The OFDM receiver 614 includes a signal reception component 622 that is configured to receive the OFDM signals 616 and a channel estimation component 624 that is configured to estimate communication channel information 626 for the data bearing tones 418a and also for the reserved tones 418b.

Also as before, a tone selection component 628 is provided. However, in the depicted embodiment the tone selection component 628 is implemented in the OFDM transmitter 612. The channel estimation component 624 is configured to send the estimated communication channel information 626 to the OFDM transmitter 612, and more specifically, to the tone selection component 628. As before, the tone selection component 628 is configured to determine tone selection information 630 based on the estimated channel information 626.

Also as before, the OFDM transmitter 612 includes a tone modification component 632. The tone selection component 628 sends the tone selection information 630 to the tone modification component 632. As discussed above, the tone modification component 632 is configured to modify the selection of the reserved tones 418b and the data bearing tones 418a in the OFDM signals 616 based on the tone selection information 630.

Figure 7A:
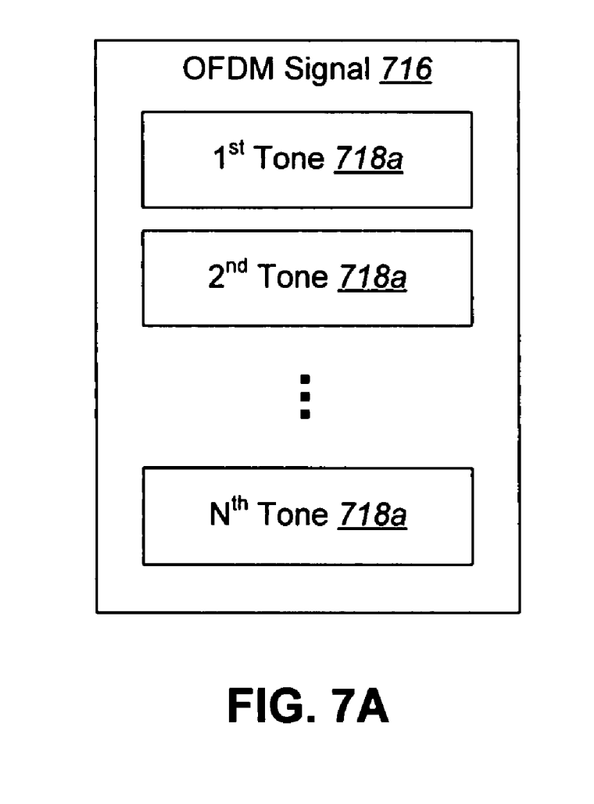
FIG. 7A illustrates an exemplary OFDM signal having N tones.

FIG. 7A illustrates an exemplary OFDM signal 716 having N tones 718. A first tone 718a, a second tone 718b, and an Nth tone 718n are shown.

Figure 7B:
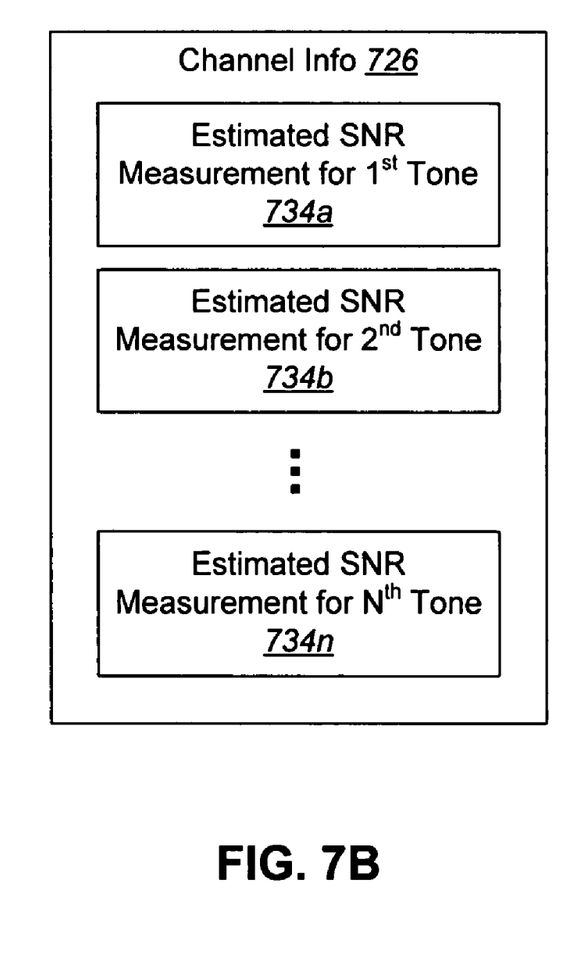
FIG. 7B illustrates an embodiment of communication channel information that may be estimated by a channel estimation component for the OFDM signal that is shown in FIG. 7A.

FIG. 7B illustrates an embodiment of communication channel information 726 that may be estimated by a channel estimation component 524 for the OFDM signal 716 that is shown in FIG. 7A. In the depicted embodiment, the channel information 726 includes an estimated signal-to-noise ratio (SNR) measurement 734 for each tone 718 in the OFDM signal 716. More specifically, the channel information 726 includes an estimated SNR measurement 734a for the first tone 718a in the OFDM signal 716, an estimated SNR measurement 734b for the second tone 718b in the OFDM signal 716, and so on, including an estimated SNR measurement 734n for the Nth tone 718n in the OFDM signal 716.

Figure 8:
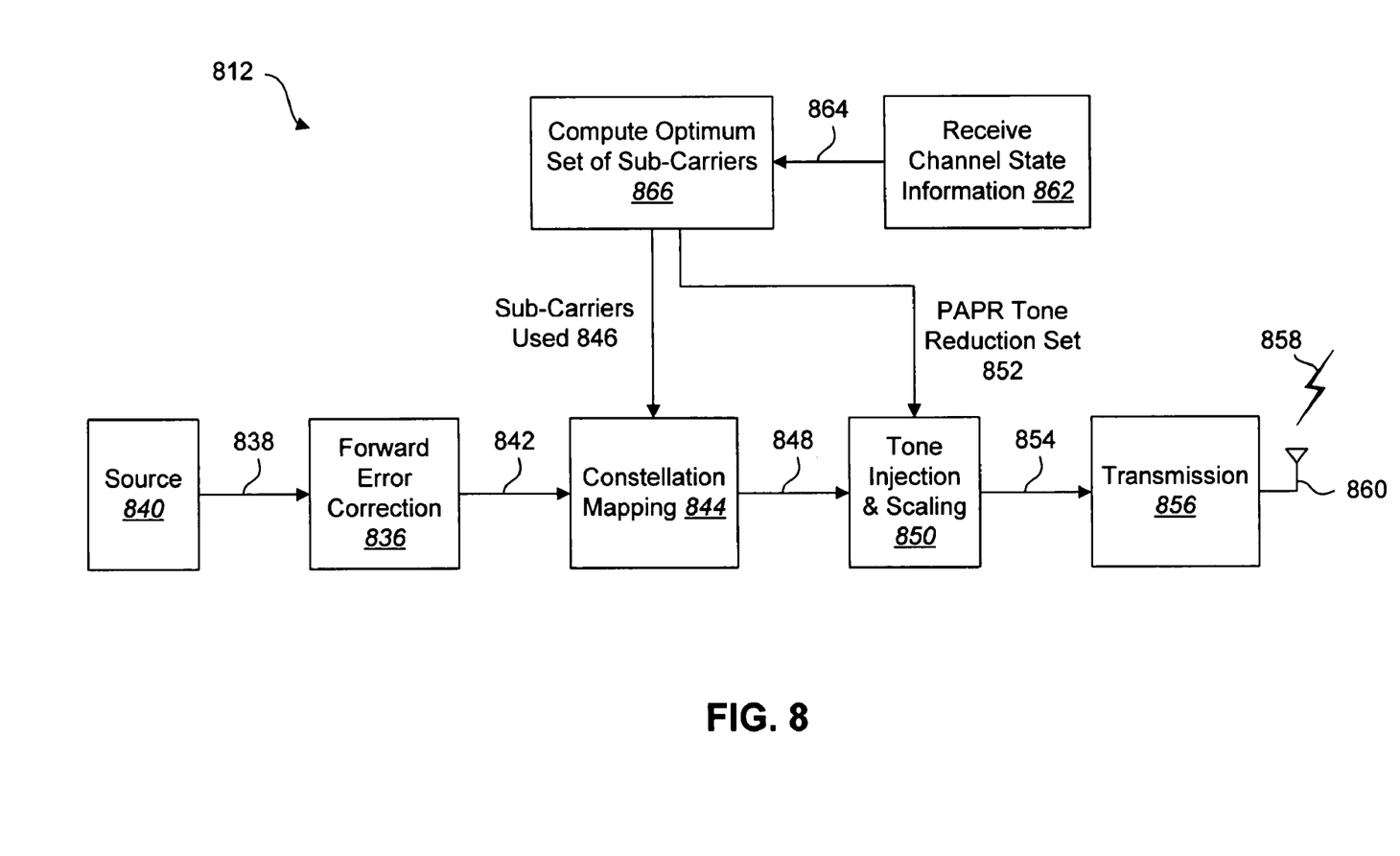
FIG. 8 illustrates an embodiment of an OFDM transmitter that is configured to implement an optimized tone reservation scheme.

FIG. 8 illustrates an embodiment of an OFDM transmitter 812 that is configured to implement an optimized tone reservation scheme. The OFDM transmitter 812 includes a component 836 that performs forward error correction (FEC) encoding. Data 838 from a data source 840 may be provided to the FEC encoding component 836. The FEC encoding component 836 encodes the data 838 in accordance with a predetermined FEC coding scheme. Examples of FEC coding schemes that may be used include block coding, convolutional coding, turbo coding, etc. The FEC encoding component 836 outputs coded data 842.

The OFDM transmitter 812 also includes a component 844 that performs constellation mapping. The coded data 842 that is output from the FEC encoding component 836 is provided to the constellation mapping component 844. Information 846 about which sub-carriers (tones) are to be used to modulate data is provided to the constellation mapping component 844. This will be discussed in greater detail below. The constellation mapping component 844 uses the sub-carrier information 846 to perform constellation mapping on the coded data 842. The constellation mapping component 844 outputs an OFDM signal 848.

The OFDM transmitter 812 also includes a component 850 that performs tone injection and scaling. The OFDM signal 848 that is output from the constellation mapping component 844 is provided to the tone injection and scaling component 850. Information 852 about which tones are to be held in reserve for purposes of minimizing PAPR is provided to the tone injection and scaling component 850. This will be discussed in greater detail below. The tone injection and scaling component 850 uses the information 852 about the reserved tones (which may be referred to as the PAPR tone reduction set 852) to perform tone injection and scaling on the OFDM signal 848. The tone injection and scaling component 850 outputs a tone injected and scaled OFDM signal 854.

The OFDM transmitter 812 also includes a transmission component 856. The tone injected and scaled OFDM signal 854 that is output by the tone injection and scaling component 850 is provided to the transmission component 856. The transmission component 856 performs RF processing on the tone injected and scaled OFDM signal 854 in order to generate an RF signal 858 that is transmitted through a transmit antenna 860 over the air.

The OFDM transmitter 812 also includes a component 862 that receives channel state information 864. This receiving component 862 provides the channel state information 864 that it receives to a component 866 that uses the channel state information 864 to compute an optimum set of sub-carriers to be held in reserve for purposes of PAPR reduction (i.e., an optimum set of reserved tones 418b). The computation component 866 provides information 846 about which sub-carriers (tones) are to be used to modulate data to the constellation mapping component 844, as discussed above. In addition, the computation component 866 provides the PAPR tone reduction set 852 to the tone injection and scaling component 850, as discussed above.

Figure 9:
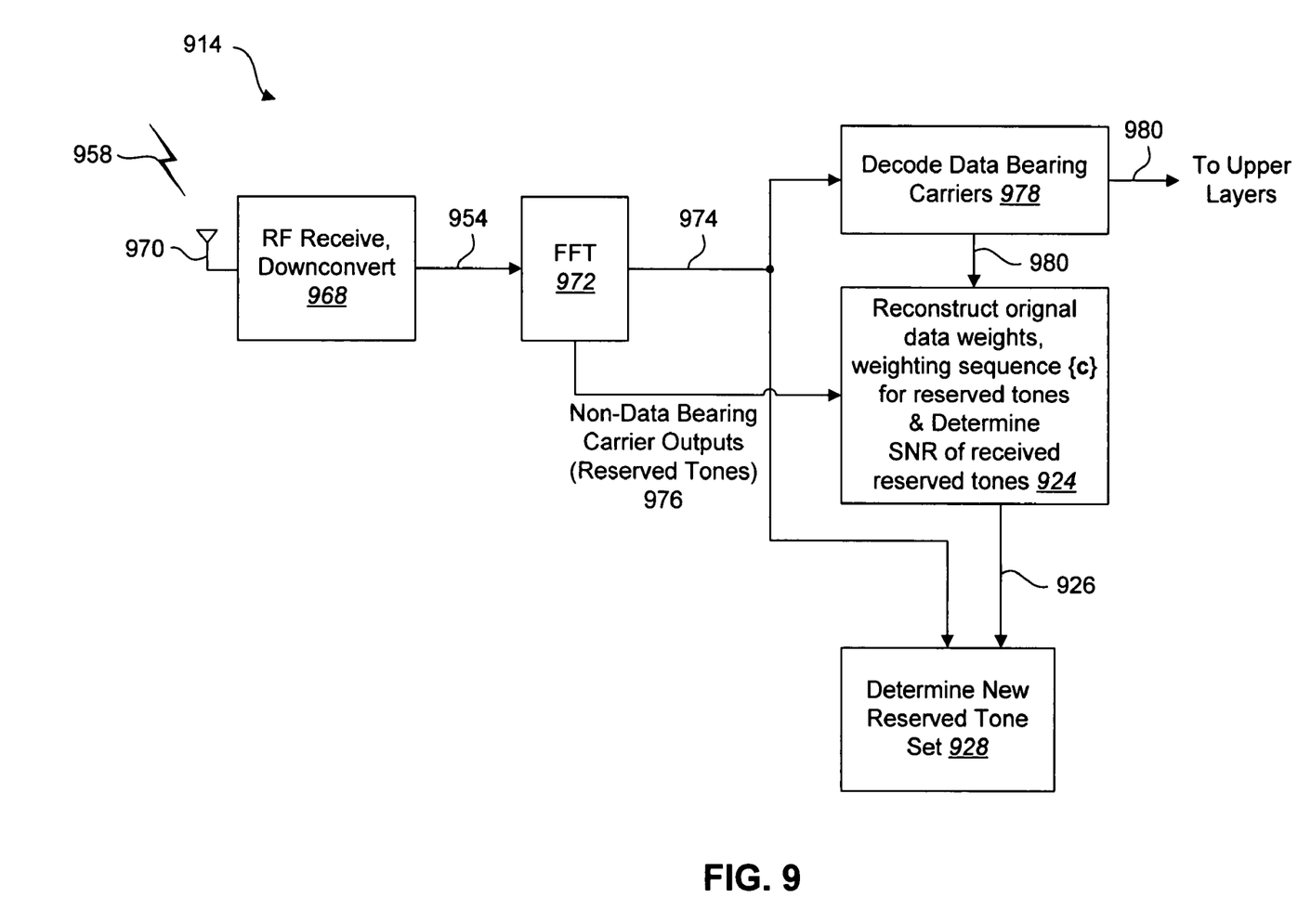
FIG. 9 illustrates an embodiment of an OFDM receiver that is configured to implement an optimized tone reservation scheme.

FIG. 9 illustrates an embodiment of an OFDM receiver 914 that is configured to implement an optimized tone reservation scheme. The OFDM receiver 914 includes an RF receiving component 968. The RF receiving component 968 includes a receive antenna 970 that receives an RF signal 958 that was transmitted by a OFDM transmitter 912. The RF signal 958 comprises a tone injected and scaled OFDM signal 954. The RF receiving component 968 downconverts the RF signal 958 in order to recapture the tone injected and scaled OFDM signal 954 that was transmitted.

The OFDM receiver 914 also includes a fast Fourier transform (FFT) unit 972. The tone injected and scaled OFDM signal 954 that is output by the RF receiving component 968 is provided to the FFT unit 972. The FFT unit 972 performs an FFT operation on the tone injected and scaled OFDM signal 954. The soft outputs of the FFT operation, consisting of the output 974 from data-bearing tones and the output 976 from reserved tones, are output from the FFT unit 972.

The OFDM receiver 914 also includes a decoding component 978. The output 974 of the data-bearing carriers is provided to the decoding component 978. The decoding component 978 decodes the data-bearing carriers. The decoding component 978 outputs decoded data 980, which is provided to upper layers within the OFDM receiver 914.

The OFDM receiver 914 also includes a channel estimation component 924. The decoded data 980 that is output from the decoding component 978 is provided to the channel estimation component 924. The channel estimation component 924 uses the decoded data 980 to construct an estimate of C. (As discussed above, the term C is the (complex) weighting vector for the reserved tones.) The channel estimation component 924 re-modulates the decoded data 980 (that is, the decoded data 980 is re-mapped into QPSK or QAM constellations, as it was transmitted). The channel estimation component 924 then performs the tone-reservation weight estimation process a posteriori. In other words, the channel estimation component 924 forms an estimate of the levels of the original transmitted signal in accordance with equation (2):

$$\min_{\hat{c}} \|x + \hat{c}\|\infty = \min_{\hat{c}} \|x + \hat{Q}\hat{c}\|\infty < \|x\|\infty \qquad (2)$$

In equation (2), the term $\hat{C}$ represents the estimate of the originally transmitted reserved PAPR reduction signal. The other terms in equation (2) were discussed above in connection with equation (1).

The non-data bearing carrier outputs 976 from the FFT unit 972 are also provided to the channel estimation component 924. The channel estimation component 924 uses the reconstructed tone data and the non-data bearing carrier outputs 976 to estimate the SNR of the reserved tones. The channel estimation component 924 outputs an estimate 926 of the SNR of the reserved tones.

The OFDM receiver 914 also includes a tone selection component 928 that determines the set of reserved tones. The data bearing carrier outputs 974 from the FFT unit 972 are provided to the tone selection component 928. The estimate 926 of the SNR of the reserved tones is also provided to the tone selection component 928. The tone selection component 928 uses the data bearing carrier outputs 974 from the FFT unit 972 and the estimate 926 of the SNR of the reserved tones to determine the set of reserved tones. The set of reserved tones may be chosen as being those carriers with the worst SNR.

A mathematical explanation of the process of determining the set of reserved tones in accordance with the depicted embodiment will now be provided. Let the data bearing carrier outputs 974 of the FFT unit 972 be denoted by y. Also let the reconstructed vector be denoted by z, which would consist of the reconstructed modulated data vector and the reserved tones. Then an error vector may be defined as in equation (3):

$$e = y - z/\|y\|^{1/2} = \{e_1, e_2, \ldots e_N\} \qquad (3)$$

In equation (3), the term $\|v\|$ denotes the sum of the squares of the magnitude of each of the components of v. The new tones may be chosen as those k tones such that are the k largest in magnitude of e. That new set of k tones would then be transmitted.

Figure 10:
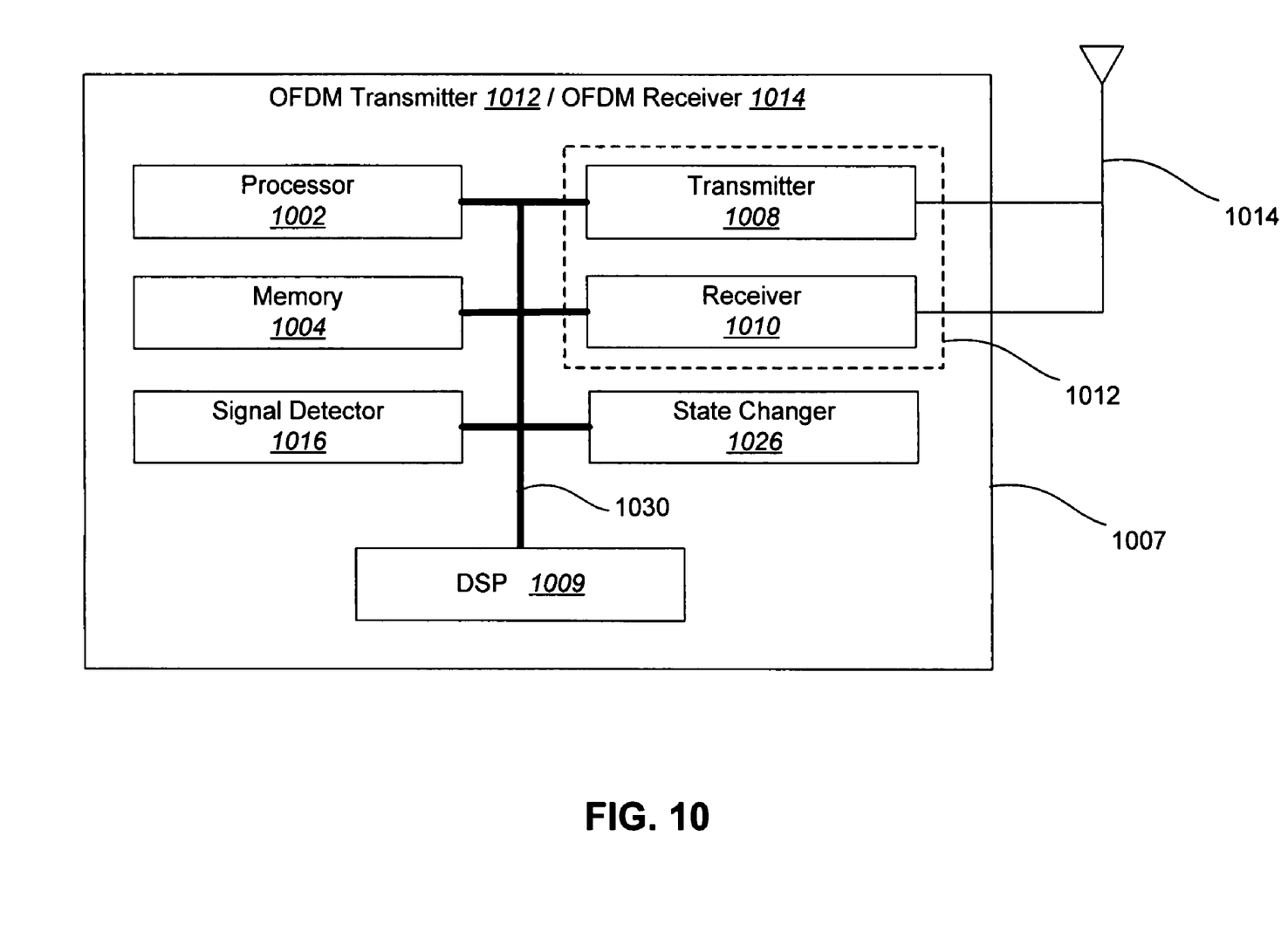
FIG. 10 illustrates various components that may be utilized in an OFDM transmitter and/or an OFDM receiver.

FIG. 10 illustrates various components that may be utilized in an OFDM transmitter 1012 and/or an OFDM receiver 1014. The OFDM transmitter 1012 and/or OFDM receiver 1014 includes a processor 1002 which controls operation of the OFDM transmitter 1012 and/or OFDM receiver 1014. The processor 1002 may also be referred to as a CPU. Memory 1004, which may include both read-only memory (ROM) and random access memory (RAM), provides instructions and data to the processor 1002. A portion of the memory 1004 may also include non-volatile random access memory (NVRAM).

The OFDM transmitter 1012 and/or OFDM receiver 1014 may also include a housing 1007 that contains a transmitter 1008 and a receiver 1010 to allow transmission and reception of data. The transmitter 1008 and receiver 1010 may be combined into a transceiver 1012. An antenna 1014 is attached to the housing 1007 and electrically coupled to the transceiver 1012. Additional antennas (not shown) may also be used.

The OFDM transmitter 1012 and/or OFDM receiver 1014 may also include a signal detector 1016 used to detect and quantify the level of signals received by the transceiver 1012. The signal detector 1016 detects such signals as total energy, pilot energy per pseudonoise (PN) chips, power spectral density, and other signals.

A state changer 1010 controls the state of the OFDM transmitter 1012 and/or OFDM receiver 1014 based on a current state and additional signals received by the transceiver 1012 and detected by the signal detector 1016. The OFDM transmitter 1012 and/or OFDM receiver 1014 may be capable of operating in any one of a number of states.

The various components of the OFDM transmitter 1012 and/or OFDM receiver 1014 are coupled together by a bus system 1030 which may include a power bus, a control signal bus, and a status signal bus in addition to a data bus. However, for the sake of clarity, the various buses are illustrated in FIG. 10 as the bus system 1030. The OFDM transmitter 1012 and/or OFDM receiver 1014 may also include a digital signal processor (DSP) 1009 for use in processing signals. One skilled in the art will appreciate that the OFDM transmitter 1012 and/or OFDM receiver 1014 illustrated in FIG. 10 is a functional block diagram rather than a listing of specific components.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An orthogonal frequency division multiplexing (OFDM) system that is configured to implement an optimized tone reservation scheme, comprising:
   an OFDM transmitter;
   an OFDM receiver that is configured to receive OFDM signals from the OFDM transmitter over a communication channel, wherein the OFDM signals comprise a plurality of tones including data bearing tones that carry data and reserved tones for generating peak-to-average-power (PAPR) reduction signals;

a channel estimation component that is configured to estimate communication channel information for the data bearing tones and also for the reserved tones;

a tone selection component that is configured to determine tone selection information based on the estimated communication channel information; and a tone modification component that is configured to modify the selection of the reserved tones and the data bearing tones in the OFDM signals based on the tone selection information.

2. The OFDM system of claim 1, wherein the tone selection component is implemented in the OFDM receiver, and wherein the tone selection component sends the tone selection information to the OFDM transmitter.

3. The OFDM system of claim 1, wherein the tone selection component is implemented in the OFDM transmitter, and wherein the channel selection component sends the estimated communication channel information to the OFDM transmitter.

4. The OFDM system of claim 1, wherein the estimated communication channel information comprises estimated signal-to-noise ratio (SNR) measurements for each of the plurality of tones in the OFDM signals.

5. The OFDM system of claim 1, wherein the tone selection information identifies an optimum set of reserved tones.

6. The OFDM system of claim 5, wherein the OFDM signals comprise a total of N tones including K reserved tones, and wherein determining the optimum set of reserved tones comprises identifying the K worst estimated signal-to-noise ratio (SNR) measurements.

7. The OFDM system of claim 1, wherein the tone selection information identifies an optimum set of data bearing tones.

8. The OFDM system of claim 7, wherein the OFDM signals comprise a total of N tones including N–K data bearing tones, and wherein determining the optimum set of data bearing tones comprises identifying the N–K best estimated signal-to-noise ratio (SNR) measurements.

9. The OFDM system of claim 1, wherein the OFDM receiver is configured so that it receives the reserved tones specifically for the purpose of estimating the communication channel information for determination of the tone selection information.

10. An orthogonal frequency division multiplexing (OFDM) receiver that is configured to implement an optimized tone reservation scheme, comprising:

a signal reception component that is configured to receive OFDM signals from an OFDM transmitter over a communication channel, wherein the OFDM signals comprise a plurality of tones including data bearing tones that carry data and reserved tones for generating peak-to-average-power (PAPR) reduction signals;

a channel estimation component that is configured to estimate communication channel information for the data bearing tones and also for the reserved tones and to provide the estimated communication channel information to a tone selection component, wherein the tone selection component is configured to determine tone selection information based on the estimated communication channel information; and a tone modification component that is configured to modify the selection of the reserved tones and the data bearing tones in the OFDM signals based on the tone selection information.

11. The OFDM receiver of claim 10, further comprising the tone selection component, wherein the tone selection component sends the tone selection information to the OFDM transmitter.

12. The OFDM receiver of claim 10, wherein the tone selection component is implemented in the OFDM transmitter.

13. The OFDM receiver of claim 10, wherein the estimated communication channel information comprises estimated signal-to-noise ratio (SNR) measurements for each of the plurality of tones in the OFDM signals.

14. The OFDM system of claim 10, wherein transmission of the estimated communication channel information from the OFDM receiver to the OFDM transmitter is observed to verify physical layer protocol conformance.

15. An orthogonal frequency division multiplexing (OFDM) transmitter that is configured to implement an optimized tone reservation scheme, comprising:

a signal transmission component that is configured to transmit OFDM signals to an OFDM receiver over a communication channel, wherein the OFDM signals comprise a plurality of tones including data bearing tones that carry data and reserved tones for generating peak-to-average-power (PAPR) reduction signals;

a tone modification component that is configured to modify which of the plurality of tones are utilized as the reserved tones and which of the plurality of tones are utilized as the data bearing tones based on tone selection information that is determined by a tone selection component, wherein the tone selection information is determined based on channel information that is estimated by a channel estimation component in the OFDM receiver; and a tone modification component that is configured to modify the selection of the reserved tones and the data bearing tones in the OFDM signals based on the tone selection information.

16. The OFDM transmitter of claim 15, further comprising the tone selection component.

17. The OFDM transmitter of claim 15, wherein the tone selection component is implemented in the OFDM receiver.

18. The OFDM transmitter of claim 15, wherein the estimated communication channel information comprises estimated signal-to-noise ratio (SNR) measurements for each of the plurality of tones in the OFDM signals.

19. The OFDM system of claim 15, wherein transmission of the reserved tones from the OFDM transmitter to the OFDM receiver is observed to verify physical layer protocol conformance.

* * * * *